D. YOUNG.

POSTHOLE DIGGER.

APPLICATION FILED NOV. 29, 1918.

1,331,310. Patented Feb. 17, 1920.

Inventor

Daniel Young,

By G. Hume Talbert

Attorney

D. YOUNG.
POSTHOLE DIGGER.
APPLICATION FILED NOV. 29, 1918.
1,331,310. Patented Feb. 17, 1920.
2 SHEETS—SHEET 2.
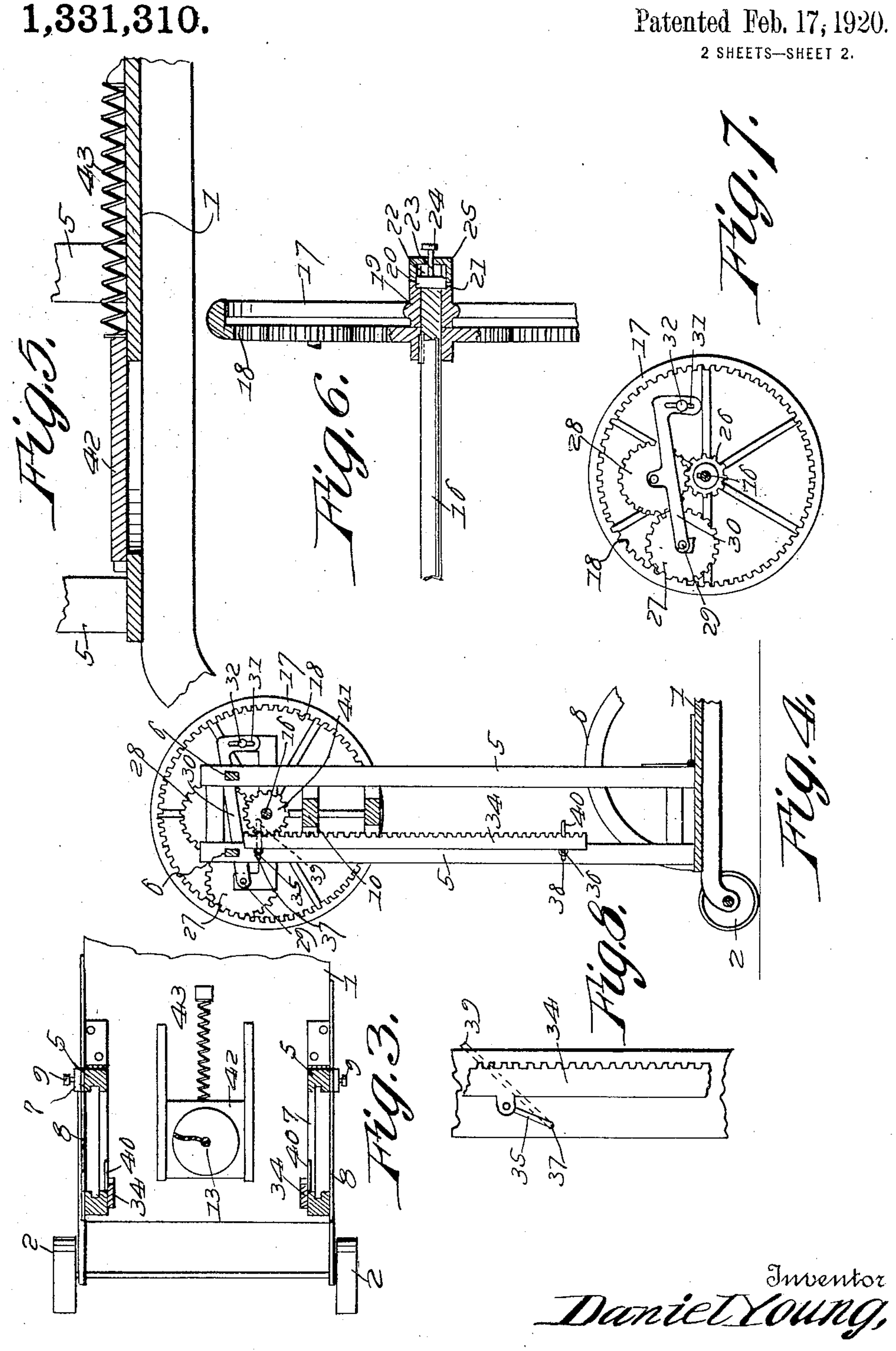
Inventor
Daniel Young,
By
P. Hume Talbert
Attorney

UNITED STATES PATENT OFFICE.

DANIEL YOUNG, OF LAUREL, INDIANA.

POSTHOLE-DIGGER.

1,331,310. Specification of Letters Patent. Patented Feb. 17, 1920.

Application filed November 29, 1918. Serial No. 264,571.

*To all whom it may concern:*

Be it known that I, DANIEL YOUNG, a citizen of the United States of America, residing at Laurel, in the county of Franklin and State of Indiana, have invented new and useful Improvements in Posthole-Diggers, of which the following is a specification.

The object of the invention is to provide a portable posthole digger which may be easily wheeled from place to place, the invention comprising a wheeled base and a boring implement suitably supported in a frame so mounted on the wheeled base that its position with respect to the latter may be varied, so that the boring implement may be positioned vertically irrespective of the position of the base.

A further purpose of the invention is the provision of means by which the boring implement is raised after it is bored to a prescribed depth.

Other and further purposes appear in the following description wherein the invention is set forth in detail.

To the exact construction in which it is shown and described, the invention is not to be restricted. The right is reserved to make such changes or alterations as the actual reduction to practice may suggest in so far as such changes or alterations are compatible in spirit with the annexed claims.

The same numerals of reference designate the same parts throughout the several figures of the drawings wherein:

Fig. 3 is a section on the line 3—3 of Fig. 1.

Fig. 4 is a section on the line 4—4 of Fig. 2.

Fig. 5 is a section on the line 5—5 of Fig. 2.

Fig. 6 is a section on the line 6—6 of Fig. 2.

Fig. 7 is a section on the line 7—7 of Fig. 2.

Fig. 8 is an enlarged fragmentary elevation of a portion of the rack and the upper operating arm.

Figures 1, 2:
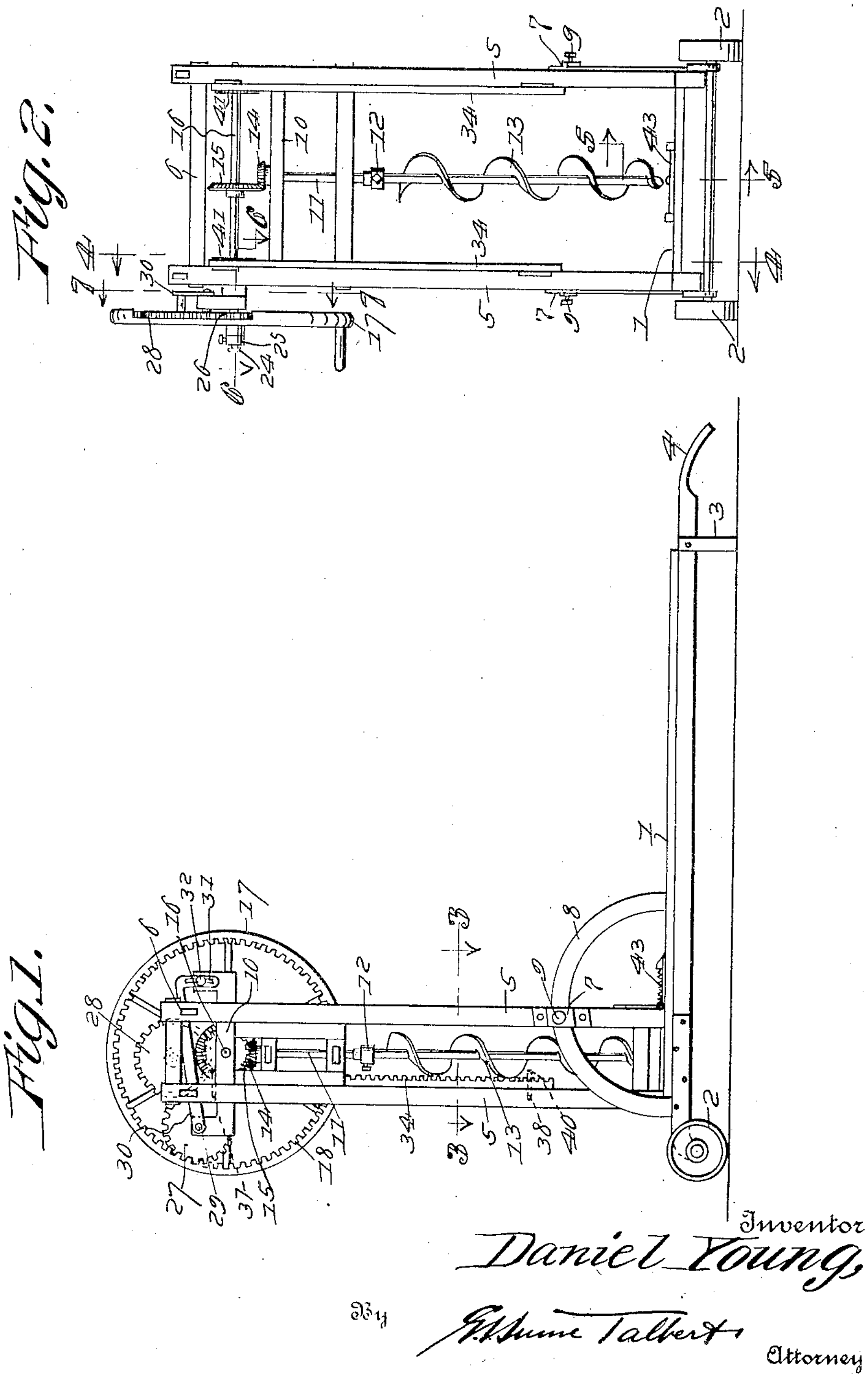
Figure 1 is a view in side elevation of the invention.
Fig. 2 is an end elevation.

As shown, the invention comprises a base 1 on one end of which there are carried the wheels 2, that end of the base remote from the wheels having the legs 3 and the handle 4, the latter obviously for the purpose of moving the base which in reality constitutes a truck.

Hingedly attached to the base adjacent the wheel end, there is an upright frame formed of the longitudinal members 5 and the transverse members 6 connected between the longitudinal members adjacent either end. Two of the longitudinal members 5 are connected with the base and each of these two is provided with a strap member 7 which embraces an arcuate slide 8 carried at either side of the base 1. Both strap members 7 are provided with set-screws 9 and these set-screws bear upon the slides 8 to hold the frame comprising the members 5 in any desired position relative to the base.

Each of the longitudinal members 5 is formed to provide a slide bearing for the movable frame 10. This latter frame may be moved toward or away from the base 1 and carries a spindle 11 which is positioned in a vertical plane when the frame comprising the members 5 and 6 is so positioned. This spindle 11 at its lower end carries a chuck 12 by means of which the boring implement 13 is secured to it. At the upper end, the spindle carries the bevel gear 14 which meshes with a bevel gear 15, the latter being carried on a shaft 16 rotatably mounted in the frame 10 in a plane at right angles to the plane of the spindle 11.

That the shaft 16 may be turned there is provided a hand wheel 17, this hand wheel being mounted on the shaft in a manner hereinafter described. This hand wheel 17 is formed at its periphery with the internal gear 18. The hand wheel 17 is mounted loosely on the shaft 16, but its hub 19 is formed with diametrically opposite key-ways 20 with which the key 21 may engage, the key being inserted transversely through the shaft 16 through a slot 22 formed therein of sufficient length to permit the key to be moved in the direction of the length of the shaft to a point where it will not engage the key-ways 20. Means for moving the key in this manner is provided in the form of a stem 23 connected to the key and passing through the end of the shaft 16, exterior to which it carries a knurled or milled head 24.

To prevent lateral movement of the hand wheel 17 on the shaft 16 there is provided a collar 25 slotted at diametrically opposite sides to provide clearance space for the key 21 when the latter is withdrawn from the key-ways 20. On that side of the hand wheel opposite the collar 25, there is carried a pinion 26 which is secured to the shaft 16.

When it is desired to run the shaft 16 relatively slowly to secure relatively low speed for the boring implement 13, the key 21 is made to engage the key-ways 20 and the hand wheel 17 thus becomes locked to the shaft 16, so that every revolution which it makes will result in a revolution of the shaft 16. When working in soft ground, however, where it is desirable to increase the speed of the boring implement 13, the gear 26 may be employed as a driving medium for the shaft 16, when this gear 26 is thus employed, the key 21 is withdrawn from the key-ways 20, thus making the hand wheel 17 float on the shaft 16. Gears 27 and 28 are provided to connect the internal gear 18 with the gear 26 and the gear 27 is always in mesh with the internal gear 18, being carried on a stud 29 fixed in the frame 10. An arm 30, however, is also carried on the stud 29, being pivotally connected to the stud at its, the arm's, one end. The remaining end of the arm 3 is provided with an arcuate slot 31 generated with the center of the stud 29 as a center. Through this slot 31 there projects a clamping screw 32 which threadingly engages the frame 10. The arm 30 carries the intermediate gear 28, which is also in mesh with the gear 27 and which may be thrown into or out of mesh with the gear 26, depending on the position of the arm 30 as a result of the adjustment of the latter afforded by the provision of the slot 31 and clamping screw 32. It is obvious that when the hand wheel 17 is allowed to float on the shaft 16, the gears 28 and 26 may be thrown in mesh, thus providing for relatively high angular velocity of the shaft 16 as compared with the angular velocity of the hand wheel 17.

Mounted upon the longitudinal members 5 opposite those hingedly connected with the base 1 there are mounted the racks 34. Each of these racks adjacent one end is pivotally connected to one end of an arm 35 and adjacent the other end pivotally connected to one end of an arm 36. In the two longitudinal members 5 which carry the racks 34, there are journaled the shafts 37 and 38. To the shaft 37 the remaining ends of the two arms 35 are fixedly connected. Similarly, to the shaft 38 the remaining ends of the two arms 36 are fixedly connected. The shaft 37 at its one end carries an arm 39, while the shaft 38 similarly carries an arm 40, both these arms being in the path of travel of the frame 10 as it is raised and lowered.

The shaft 16 carries two spur gears 41 which may mesh with the two racks 34 when the arms 35 and 36 are in positions approaching right angular positions with reference to the longitudinal members 5. This being the case when the arms 35 and 36 approach positions in alinement with the longitudinal members 5, the racks 34 are moved upwardly and away from the gears 41.

That means may be provided for covering the post hole bored, the platform of the base 1 carries a slide member 42 against which there bears a spring 43 forcing the slide member against the boring implement and when the implement is raised this slide member is projected forward by the spring so that it covers the hole and prevents the dirt falling back in the same.

In the use of the device, it is intended that the boring implement shall be fed downward by its own weight, the weight of the frame 10 and its attendant parts and its peculiar screw-shaped body. Thus when the implement is boring the arms 35 and 36 are in positions approaching the vertical, since the frame composed of the members 5 and 6 must be vertical if the post hole is to be bored vertically. As the frame 10 descends due to the implement boring a hole and raising the dirt therefrom, the frame is finally brought into contact with the arm 40, thus depressing the free end of the arm and rocking the shaft 38, thereby lowering the arms 36, the racks 34 and the arms 35, the racks during this movement moving toward the gears 41 with which they are finally brought into mesh. Thereupon, the continued turning of the hand wheel 17 causes the gears 41 to climb the racks 34 and thus raise the frame 10 and with it the boring implement 13, the latter all the while turning right-handedly and thereby raising and ejecting the dirt which it has loosened. When the boring implement 13 is finally withdrawn from the ground, the slide member 42 covers the hole made.

The elevating of the frame 10 will continue until it is brought into contact with the arm 39, whereupon the shaft 37 is operated and the racks 34 thrown back to positions where they no longer mesh with the gears 41.

It is obvious that the frame comprising the members 5 and 6, when the boring implement is not in use, may be folded down against the base for transportation from one point to another. It is also obvious that the employment of the arcuate slides 8 affords means for positioning the frame in a vertical position irrespective of whether the base 1 is level or not.

The invention having been described, what is claimed as new and useful is:

1. A device of the class described comprising a frame, a second frame mounted in the said frame for vertical movement therein, a boring implement rotatably mounted in said second frame, means for rotating the boring implement so that it may be made to enter the ground and thereby lower the second said frame, and means rendered operative by the second said frame causing the last said means to elevate the frame after it has lowered a prescribed distance.

2. A device of the class described comprising a frame, a second frame slidably mounted in the first for vertical movement therein, a boring implement rotatably mounted in said second frame, a shaft journaled in said second frame, means for turning the shaft, connections between the shaft and the boring implement, racks carried by the first said frame, gears carried by the shaft, and means connected with the racks and operable by the second said frame whereby the said racks may be thrown into mesh with the said gears for the useful purpose specified.

3. A device of the class described comprising a gravitation boring implement, means for rotating the boring implement, and means rendered operative by the boring implement, whereby the latter, after it has bored a prescribed distance is automatically returned to its initial position by the rotating means.

4. A device of the class described comprising a boring implement, means for rotating the same, a base on which the boring implement is carried so as to be permitted its rotary movement, and a spring held slide member bearing an edge against the side of the boring implement, so that when the latter has completed the boring of a hole the slide member may be immediately passed to a position of closure for the hole for the useful purpose specified.

In testimony whereof I affix my signature.

DANIEL YOUNG.